Jan. 31, 1933.  A. NEVEU  1,895,483
LOAD BRAKE APPARATUS
Filed Dec. 28, 1929  2 Sheets-Sheet 1

INVENTOR
ANSELME NEVEU
BY
*Wm. M. Cady*
ATTORNEY

Jan. 31, 1933.  A. NEVEU  1,895,483
LOAD BRAKE APPARATUS
Filed Dec. 28, 1929  2 Sheets-Sheet 2
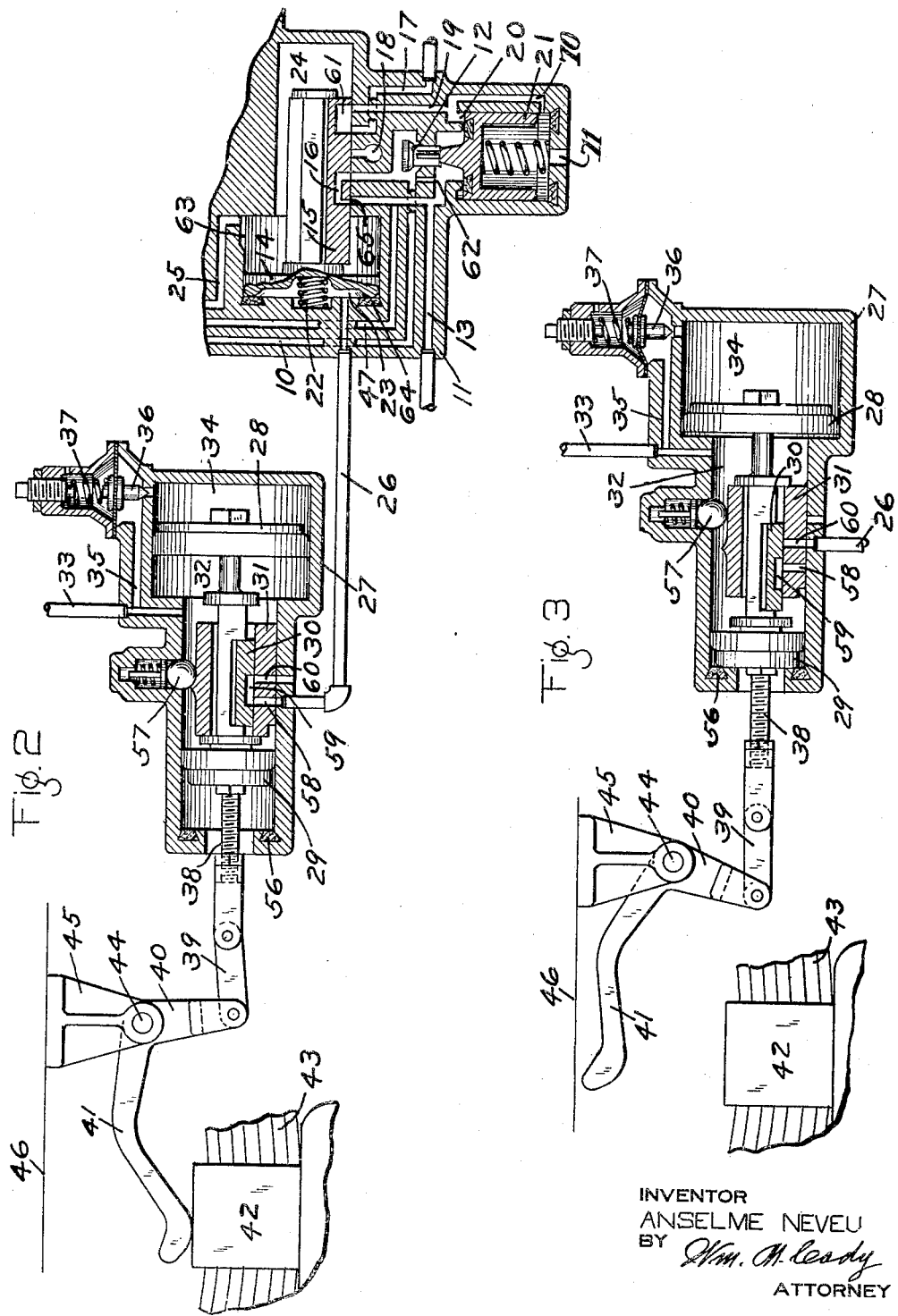
INVENTOR
ANSELME NEVEU
BY
Wm. H. Cady
ATTORNEY Patented Jan. 31, 1933

1,895,483

UNITED STATES PATENT OFFICE

ANSELME NEVEU, OF LIVRY-GARGAN, FRANCE, ASSIGNOR TO THE WESTINGHOUSE AIR BRAKE COMPANY, OF WILMERDING, PENNSYLVANIA, A CORPORATION OF PENNSYLVANIA

LOAD BRAKE APPARATUS

Application filed December 28, 1929, Serial No. 417,030, and in France February 9, 1929.

This invention relates to fluid pressure braking apparatus for railway and other vehicles of the kind in which the operative condition of the apparatus is arranged to be varied automatically in accordance with the load of the vehicle to be braked, so as automatically to provide for variation of the braking effort in accordance with the load of the vehicle.
According to the present invention the light or load condition of the braking apparatus is arranged to be determined automatically only under predetermined conditions dependent upon the degree of pressure obtaining or obtained in a selected portion of the braking system and preferably upon a predetermined reduction of train pipe pressure having been effected, the arrangements provided for this purpose being preferably arranged to be automatically rendered inoperative before the braking system has been fully charged or restored to its normal working pressure. By this arrangement the light or load adjusting arrangements associated with the braking system are not affected during normal running of the vehicle.

For example, arrangements may be provided which are adapted to be influenced by the deflection of the vehicle springs owing to the load of the vehicle so as automatically to render a supplementary brake cylinder or cylinders available upon a loaded vehicle, these arrangements being arranged to be influenced by the pressure in the train pipe and rendered inoperative for example whenever the train pipe pressure exceeds a predetermined value.

The invention is however, not limited in its application to braking systems in which supplementary brake cylinders are provided for braking loaded vehicles, the increased braking effort required upon a loaded vehicle being obtained in any suitable manner.

In order that the invention may be readily understood it will now be described by way of example only with reference to the accompanying drawings in which:—

Figure 1 is a sectional view illustrating the invention as applied to fluid pressure braking apparatus of the kind in which a supplementary brake cylinder is provided for obtaining an increased braking effort upon a loaded vehicle, the automatic controlling arrangements provided for the purpose of varying the operative condition of the apparatus in accordance with the load being shown in the condition for braking a light vehicle.

Figure 2 is a similar view with the automatic controlling arrangements in a condition for braking a loaded vehicle.

Figure 3 is a view illustrating the condition of the automatic controlling arrangements during running.

Figure 1:
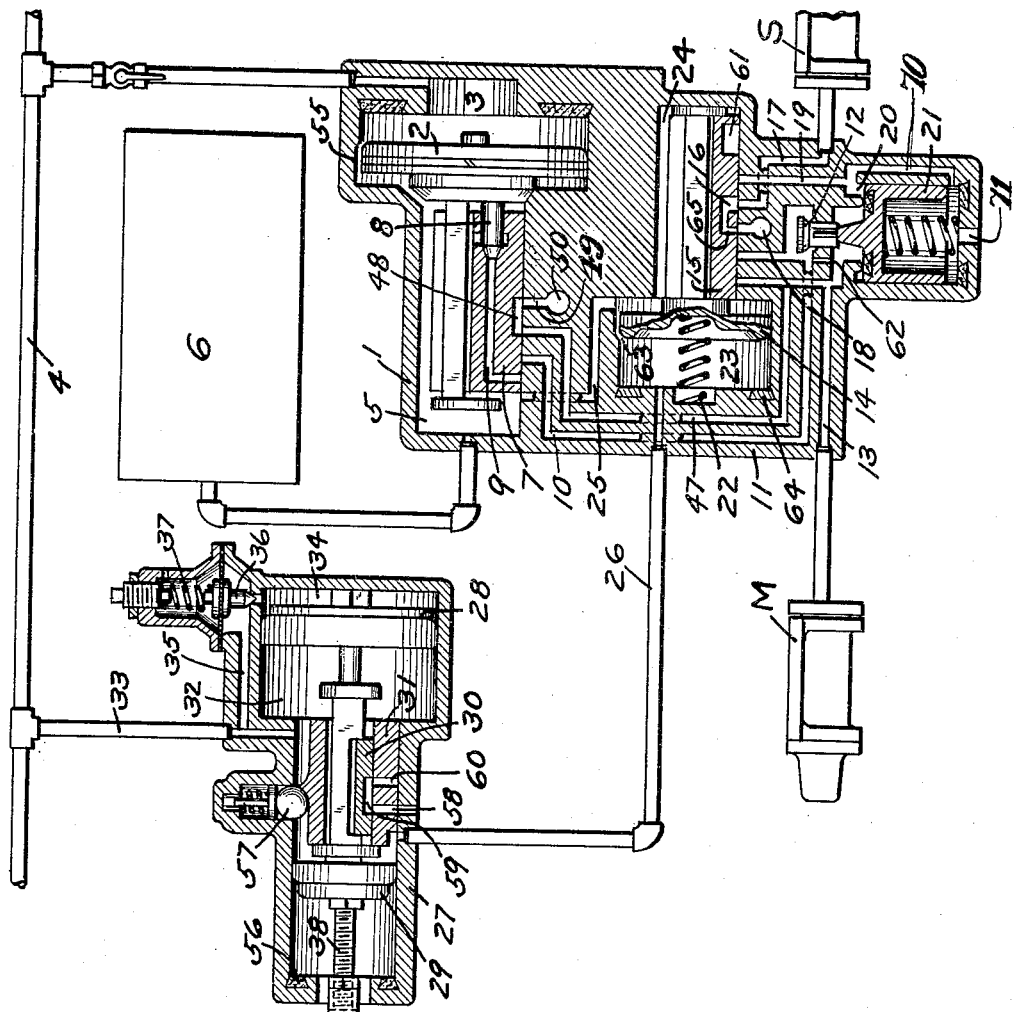
Figure 1:
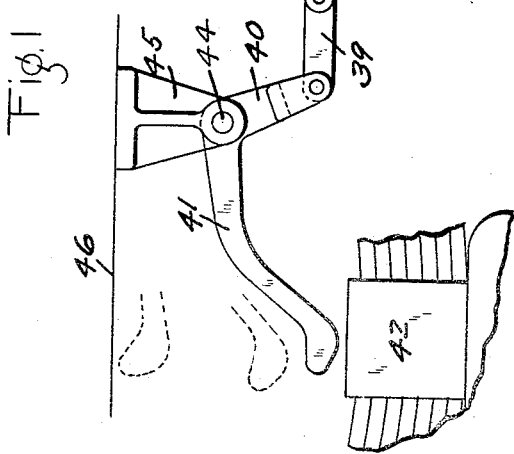

Referring first to Figures 1, 2 and 3 of the drawings, the apparatus comprises a distributing valve device having a casing 1 containing a piston 2 subject on one side in the chamber 3 to the pressure in the train pipe 4 and on the other side in the slide valve chamber 5 to the pressure obtaining in the usual auxiliary reservoir 6. The piston 2 is operatively connected to a slide valve 7 and a graduating valve 8, the latter of which is adapted to be opened upon a reduction in train pipe pressure so as to supply fluid under pressure from the auxiliary reservoir 6 through a passage 9 in the slide valve 7 to a passage 10 in the lower part 11 of the distributing valve casing 1 and thence past a valve 12 to a main brake cylinder M through a passage 13.

In the lower part 11 of the casing 1 of the distributing valve device a slide valve device is provided comprising a piston 14 operatively connected to a slide valve 15, this slide valve having a cavity 16 therein adapted in one of the positions of the slide valve to connect a passage 17 leading to a supplementary brake cylinder S to the atmosphere through an atmospheric port 18 and a cavity 61 adapted in another position of the slide valve 15 to connect the passage 17 to a passage 19 leading to a chamber 20 at the outer seated area of a piston 21 operatively connected to the valve 12. The piston 14 is arranged to be influenced on its left hand side by a spring 22 and the fluid pressure in a chamber 23 and on its right hand side to the pressure obtaining in the slide valve chamber 24 which is connected through a passage 25 with the slide valve chamber 5 of the distributing valve device.

The chamber 23 on the left hand side of the piston 14 is connected through a conduit 26 with a controlling valve device 27, which is adapted to be automatically operated in accordance with the load upon the vehicle so as to control the slide valve 15 in the lower part 11 of the distributing valve casing 1 as will hereinafter be described.

The controlling valve device 27 comprises interconnected differential pistons 28 and 29 which are adapted to operate a graduating slide valve 30 and a main slide valve 31, a chamber 32 between the two differential pistons 28 and 29 being supplied with fluid under pressure from the train pipe 4 through a branch pipe 33.

Fluid under pressure is also arranged to be supplied from the train pipe to a chamber 34 on the right hand side of the piston 28 through a passage 35 and past a valve 36 which is arranged to be held closed by means of a spring 37 until the pressure in the train pipe 4 has attained a predetermined value. The left side of the piston 29 is subject to atmospheric pressure and the two differential pistons 28 and 29 are connected by means of a rod 38 and link 39 to the shorter arm 40 of a bell crank lever, the longer arm 41 of which is adapted to co-operate with the axle box 42 of the vehicle which is secured to the vehicle spring 43, the bell crank lever itself being pivotally mounted at 44 on a bracket 45 secured to the vehicle body 46.

The operation of the apparatus is as follows:—

Assuming that the brake system is at atmospheric pressure and that fluid under pressure is being supplied to the train pipe 4 so as to charge the apparatus and that the vehicle upon which the apparatus is installed is only lightly loaded the longer arm 41 of the bell crank lever will be in its lowest position (Figure 1), in contact with the axle box 42 and the differential pistons 28 and 29 will be in their extreme positions towards the right in which communication is established between the train pipe 4 and the chamber 23 in the lower part 11 of the casing 1 of the distributing valve device through the branch pipe 33, slide valve chamber 32 and conduit 26.

With the brake system at atmospheric pressure, the valve 36 will be held seated by spring 37, and as the brake pipe pressure is increased, the fluid pressure in chamber 32 is correspondingly increased, while the pressure in chamber 34 remains at atmospheric pressure. As a result, the piston 28 is shifted to the extreme right hand position, as shown in Fig. 1, since the car, being empty, permits the lever 41 to assume its lowest position.

Under these conditions therefore the piston 14 is moved towards the right and establishes communication between the conduit 17 leading to the supplementary brake cylinder S and the atmospheric exhaust port 18 so that the supplementary brake cylinder is rendered inoperative.

While the fluid under pressure is being supplied to the train pipe 4 the piston 2 of the distributing valve device is in its left hand or release position in which communication is established between the main brake cylinder and the atmosphere through the passages 13 and 47, slide valve cavity 48, passage 49 and atmospheric exhaust port 50. Fluid under pressure is supplied to the auxiliary reservoir 6 past the usual feed groove 55 and through the slide valve chamber 5 from which fluid is also supplied through the passage 25 to the chamber 24 on the right hand side of the piston 14.

The fluid pressures on the opposite sides of the piston 14 being substantially equal to one another, the piston, together with its slide valve 15 is maintained in its left hand position by the spring 22.

When the pressure in the train pipe 4 exceeds a predetermined value, for example 30 pounds with a pressure of 70 pounds normally maintained in the brake pipe, the valve 36 is raised from its seat and fluid under pressure is supplied from the train pipe to the chamber 34 in the controlling valve device, so that the two interconnected differential pistons 28 and 29 are rapidly moved towards the left, the piston 29 being adapted to engage with a suitable seat 56 in the interior of the control valve casing thus preventing leakage of fluid from the train pipe to the atmosphere. The movement towards the left of the differential pistons 28 and 29 causes the bell crank lever to be rotated in a clockwise direction so that its longer arm 41 is out of contact with the axle box 42 and is therefore no longer influenced by deflections of the vehicle spring 43 due to variations in the load on the vehicle or any other reason (Figure 3). In this position of the bell crank lever the graduating slide valve 30 of the control valve device illustrated in Figure 3 of the drawings, cuts off the chamber 23 in the lower part 11 of the distributing valve device, the port 60 in the slide valve 31 which is connected to the conduit 26 being blanked by the slide valve 30 and the slide valve 15 is therefore maintained by the spring 22 in its right hand position in which the supplementary brake cylinder S is permanently connected through the passage 17, recess 16 in the slide valve to the atmospheric port so that when the brakes are applied by reduction in train pipe pressure fluid under pressure will only be supplied to the main brake cylinder, a feed groove 63 being provided around the piston 14, so that the fluid pressures on opposite sides of the piston 14 are maintained equalized.

When it is desired to effect an application of the brakes, the train pipe pressure is reduced in the usual manner with the result that the distributing valve piston 2 moves towards the right under the influence of auxiliary reservoir pressure. In this position (application position) of the piston 2, fluid is supplied from the auxiliary reservoir 6 to the main brake cylinder M through the passages 9 and 10, past valve 12 and through passage 13, connection between this brake cylinder and the atmopheric ports being cut off by the slide valve 7.

As soon as the pressure in the main brake cylinder attains a predetermined value, the piston 21 is caused to descend and causes the valve 12 to be applied to its seat, fluid then being supplied to the main brake cylinder only through the restricted port 62. During an application of the brakes the bell crank lever is maintained with its longer arm 41 out of contact with the axle box 42 (as illustrated in Figure 3) and with the piston 14 in its right hand position (Figure 1), the supplementary brake cylinder is not supplied with fluid under pressure through the passages 9 and 10, chamber 20 at the outer seated areas of the piston 21, and passages 19 and 17 as the passage 19 is blanked by the slide valve 15.

A passage 70 connects chamber 20 with the atmospheric port 71 when the piston 21 is seated at its upper seat, so that possible leakage of fluid under pressure from the chamber open to the inner seated area of the piston 21, to the chamber 20, will be vented to the atmosphere and the building up of fluid pressure in chamber 20 will thus be prevented when the piston 21 is seated at its upper seat. When the piston 21 is seated at its lower seat, communication from passage 70 to the atmosphere is cut off, so that fluid under pressure supplied from passage 13, past the unseated piston 21 to passage 19 cannot escape to the atmosphere.

Having in mind that while running, the control device remains in the position shown in Fig. 3, when the brake pipe pressure is allowed to escape or be completely vented, as when a car is set out, the pressure in chamber 32 will reduce with the brake pipe and, so long as the valve 36 remains open, the pressure in chamber 34 also reduces with the brake pipe. When the brake pipe pressure has been reduced to a predetermined low degree, such as thirty pounds, the valve 36 will be seated. The pressure in chamber 32 continues to reduce with the brake pipe to atmospheric pressure, but the fluid pressure in chamber 34 will also be reduced, although more slowly, by ordinary leakage from chamber 34 past the packing cup of piston 28 to chamber 32.

When the vehicle to be braked is loaded as shown in Figure 2 of the drawings and fluid under pressure is supplied to the train pipe, which was previously empty in order to charge the braking system, the pistons 28 and 29 are moved towards the right and bring the longer arm 41 of the bell crank lever into contact with the axle box 42, the slide valves 30 and 31 being brought to the positions in which they are illustrated in Figure 2, the graduating slide valve 30 being arranged to be under the influence of a spring ball 57. In this position of the differential pistons 28 and 29 the chamber 23 in the lower part 11 of the distributing valve device is in communication with atmosphere through the conduit 26, port 58 in the slide valve 31, recess 59 in the graduating slide valve 30 and port 60 in the slide valve 31.

When train pipe pressure is raised in order to charge the braking system fluid under pressure supplied to the chamber 3 of the distributing valve device and thence to the slide valve chamber 24 through slide valve chamber 5 and passage 25 causes the piston 14 to be moved towards the left against the action of the spring 22 so as to cut off communication between the supplementary brake cylinder and the atmospheric port 18 and establish communication between the supplementary brake cylinder and the passage 19 through the passage 17 and recess 61 in the slide valve 15. As soon as the train pipe pressure exceeds a predetermined value, as previously described the differential pistons are moved to their extreme positions towards the left in which the longer arm 41 of the bell crank lever is out of contact with the axle box 42 as illustrated in Figure 3.

In this position of the differential pistons 28 and 29 the slide valve 30 blanks the port 60 in the slide valve 31 so that the piston 14 is maintained in its left hand position on its seat 64 by means of auxiliary reservoir pressure acting in the chamber 24, the feed groove 63 around the piston 14 being cut off in this position of the piston. In this case when the train pipe pressure is reduced in order to effect an application of the brakes in the usual manner fluid is supplied to the main brake cylinder M through the passage 9, passage 10, past valve 12, and through the passage 13 and as soon as the pressure in the main brake cylinder has attained a predetermined value, the piston 21 is depressed thereby restricting the flow of fluid to the main brake cylinder and permitting the supply of fluid under pressure from the chamber at the inner seated area of piston 21 to chamber 20 at the outer seated area of piston 21 through the passage 19, recess 61 in the slide valve 15 and the passage 17, to the supplementary brake cylinder S.

It will therefore be evident that the operative condition of the apparatus (in the example given above, the position of the slide valve 15 in accordance with the load upon the vehicle) is not varied under running conditions but is only varied during the charging of the apparatus until the pressure in a portion of the system (in the present example the train pipe pressure) has attained a predetermined value.

Reference may here be made to the fact that when braking upon a loaded vehicle with the particular type of apparatus described hereinabove it is desirable to permit a less restricted flow of fluid to the main brake cylinder as well as to the supplemental brake cylinder during the second stage of the braking after the valve 12 has closed than when braking a light vehicle and it is for this reason that the recess 16 in the slide valve 15 is adapted to connect the passage 10 to the passage 13 through a restricted port 65 during the second stage in braking a loaded vehicle as well as through the port 62.

It will be evident that so long as the train pipe is not completely vented, the controlling valve device will remain in its inoperative condition, the bell crank lever being maintained out of contact with the axle box 42 by the train pipe pressure acting in the chamber 34 on the piston 28. It will therefore be evident that the operative condition of the braking apparatus will be varied in accordance with the load of the vehicle whenever the train pipe is completely vented and recharged until the pressure therein attains a predetermined value dependent upon the strength of the spring 37 of the valve 36 in the controlling valve device 27.

It will be evident that the invention is not limited to the particular construction and arrangement of parts hereinabove described which may be varied as desired to suit particular requirements without exceeding the scope of the invention.

Having now described the invention, what is claimed as new and desired to be secured by Letters Patent, is:

1. In a fluid pressure brake system, the combination with a valve mechanism operative to adjust the braking power according to the light or loaded condition of the vehicle, of a member movable according to the load for operating said valve mechanism, and means controlled by the fluid pressure in the brake system and operated upon a predetermined increase in fluid pressure in the brake system for moving said member out of its operative position.

2. In a fluid pressure brake system, the combination with apparatus automatically operative according to the load on the vehicle for adjusting the braking power and having an operative and an inoperative position, of means operated upon an increase in brake pipe pressure above atmospheric pressure for moving said apparatus to its operative position and means operative upon a further predetermined increase in brake pipe pressure for moving said apparatus to its inoperative position.

3. In a fluid pressure brake system, the combination with a valve mechanism operative to determine the braking power, of means for controlling the operation of said valve mechanism including a member movable according to the load on the vehicle, said means being operated upon a predetermined increase in fluid pressure in the brake system for rendering said member inoperative by the load on the vehicle.

4. In a fluid pressure brake system, the combination with a valve mechanism operative to determine the braking power, of means for controlling the operation of said valve mechanism including a member movable according to the load on the vehicle, said means being operated upon a complete venting of fluid pressure from the brake system for rendering said member operative by the load on the vehicle.

5. In a fluid pressure brake, the combination with a brake pipe and a valve mechanism operative to adjust the braking power, of means for controlling the operation of said valve mechanism including a member movable according to the load on the vehicle, said means being subject to brake pipe pressure and being operated upon a predetermined increase in brake pipe pressure for moving said member out of its operative position.

6. In a fluid pressure brake system, the combination with a valve mechanism operative to adjust the braking power according to the light or loaded condition of the vehicle, of a member movable according to the light or loaded condition of the vehicle for operating said valve mechanism and having an operative and an inoperative position, and means subject to the pressure of fluid in the brake system and operative as the pressure in the brake system is increased from an uncharged or low pressure condition in the brake system to move said member to its operative position.

7. In a fluid pressure brake system, the combination with a valve mechanism operative to adjust the braking power according to the light or loaded condition of the vehicle, of a member movable according to the light or loaded condition of the vehicle for operating said mechanism and having an operative and an inoperative position, and means subject to the pressure of fluid in the brake system and operative as the pressure in the brake system is increased from an uncharged or low pressure condition in the brake system to move said member to its operative position, said means being further operative upon a further predetermined increase in fluid pressure in the brake system to move said member to its inoperative position.

In testimony whereof I have hereunto set my hand.

ANSELME NEVEU.